June 27, 1939. T. CHRISTIE 2,163,868
CUTTING MACHINE
Filed Nov. 9, 1936 3 Sheets-Sheet 2
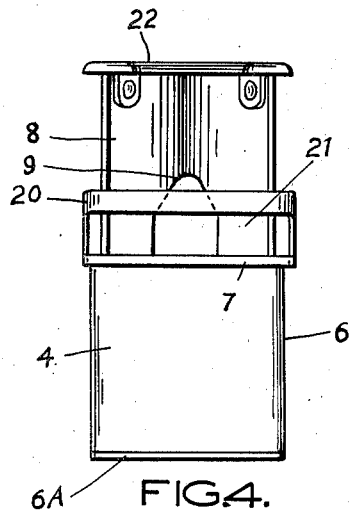
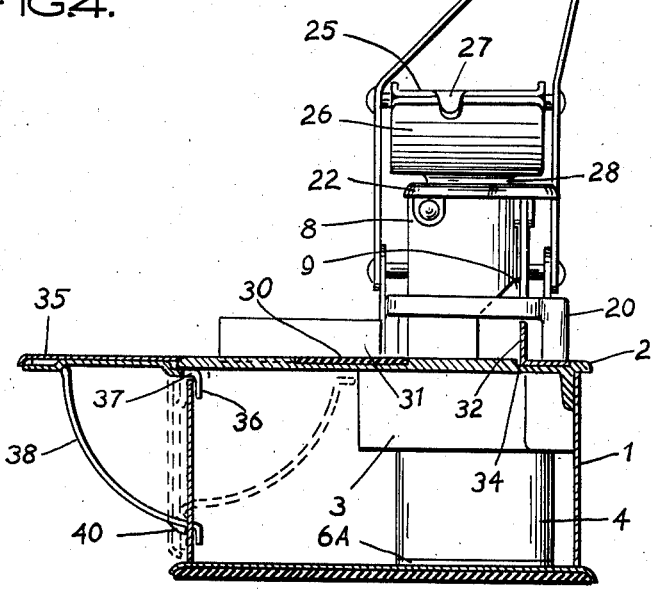
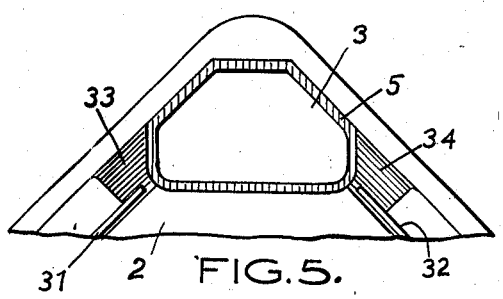
INVENTOR
THEODORE CHRISTIE
BY
ATTORNEY June 27, 1939.  T. CHRISTIE  2,163,868
CUTTING MACHINE
Filed Nov. 9, 1936   3 Sheets-Sheet 3

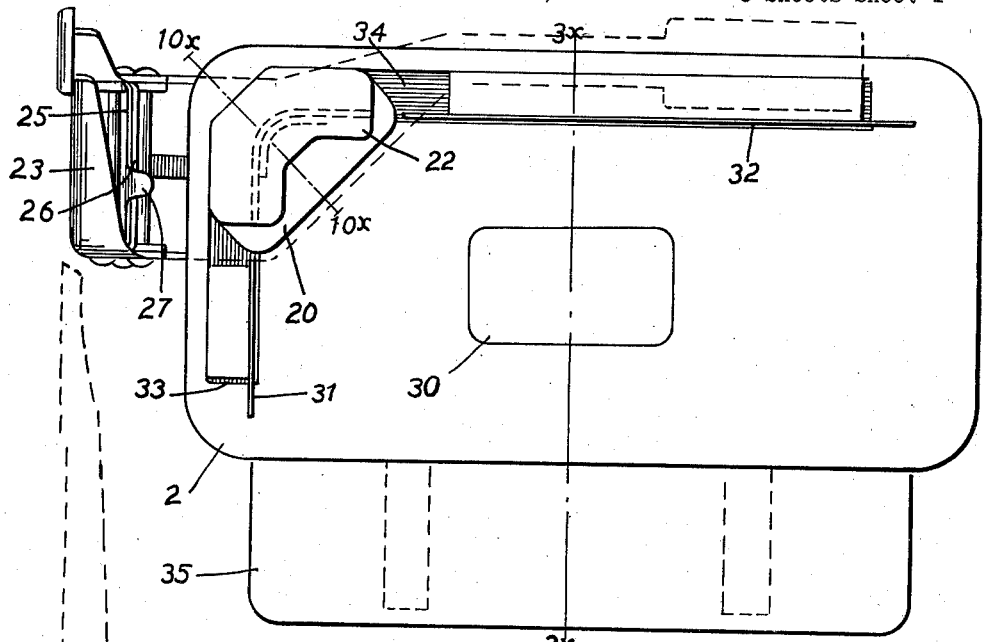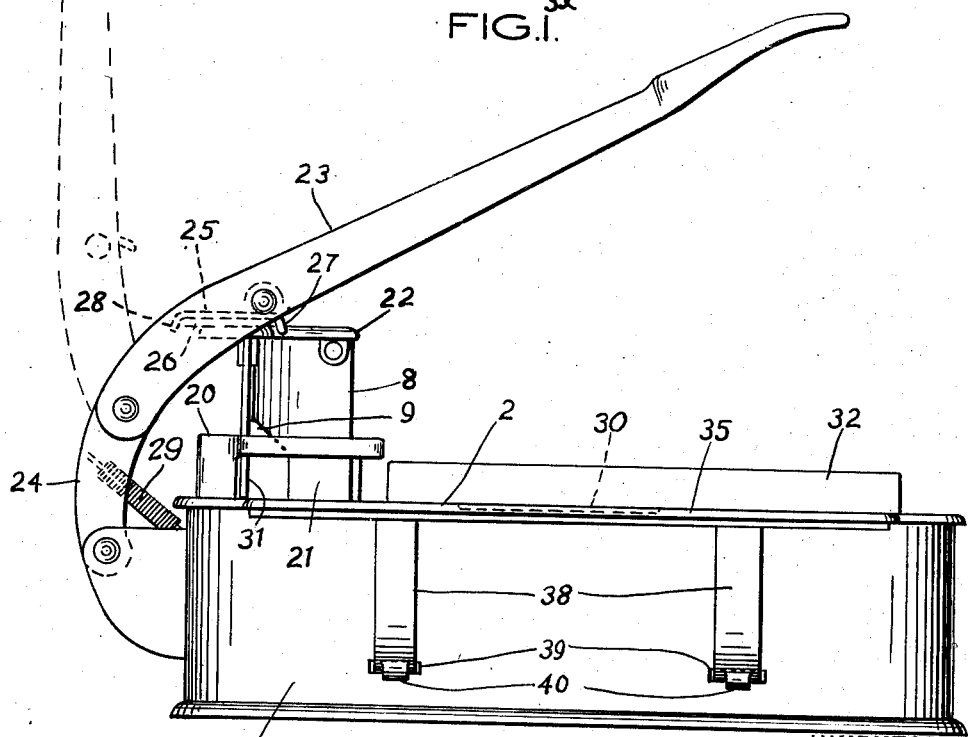

INVENTOR
THEODORE CHRISTIE
BY
*Eric Eshinger* ATTORNEY

Patented June 27, 1939

2,163,868

UNITED STATES PATENT OFFICE 2,163,868

CUTTING MACHINE

Theodore Christie, Rochester, N. Y., assignor to Lassco Products, Inc.

Application November 9, 1936, Serial No. 109,818

15 Claims. (Cl. 164—47)

This invention relates to cutting machines for trimming the corners of sheet stock and the object thereof is to provide a new and improved construction for such a machine.

A further object of this invention is to so construct the cutting machine that interchangeable cutting units may be used in the cutting machine.

Another object of this invention is to provide the cutting machine with novel holding means for holding the sheet stock against movement during the cutting operation.

A further object of the invention is to provide the cutting units of the cutting machine with a combined guard and gauge for the protection of the operator and the gauging of the amount of sheet stock that may be trimmed during one operation of the cutting machine.

A further object of this invention is to provide the cutting machine with a novel lever mechanism for efficiently operating the movable trimming knife of the cutting machine.

Another object of this invention is to provide the cutting machine with a collapsible extension table and novel support therefor.

A further object of this invention is to provide the cutting machine with a novel mounting for the alignment guides thereof.

A further object of this invention is to provide the trimming knife with novel guide means.

Another object of this invention is to provide the cutting machine with a stationary blade held floating against the movable trimming knife so as to provide an efficient shearing action between them.

All these and other objects and attendant advantages of this invention will become more fully apparent from the detailed description thereof which follows, reference being had to the accompanying drawings in which Figure 1 is a top plan view of the cutting machine.

Figure 2 is a side elevation thereof.

Figure 3 is a transverse cross sectional view of the cutting machine, the section being taken on the line $3x$—$3x$ of Figure 1.

Figure 4 is a detail front elevation of one of the cutting units for the cutting machine.

Figure 5 is a top plan view of the corner of the machine in which the cutting units are removably mounted with the cutting unit removed.

In the several figures of the drawings like reference numerals indicate like parts.

Figure 6:
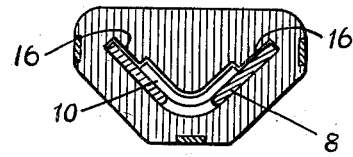
Figure 6 is a horizontal sectional view of the cutting unit taken on the line $6x$—$6x$ of Figure 7.

The cutting machine forming the subject matter of this invention is especially adapted for use in trimming the edges of practically any kind of sheet stock so as to provide rounded or other shaped corners thereon. As illustrated in the various figures of the drawings the cutting machine comprises a suitable casing 1 which supports at the top the table 2. In one corner of this table is formed a socket 3 which extends into the casing for interchangeably locating a cutting unit 4 therein. The socket 3 is surrounded by the seat 5 to also partially support the cutting unit when inserted thereinto.

Each cutting unit has a cast body member 6 which is shaped for ready insertion into the socket 3 in order to locate and hold the unit in a predetermined position in the table 2. The shoulder 7 is formed around the top of the body member 6 for engagement into the seat 5 of the socket 3 in order to support the body member in the table top with the bottom of the cutting unit resting on the bottom of the casing. Each cutting unit is thus firmly and automatically supported in a fixed position on the insertion thereof into the socket 3.

Figure 7:
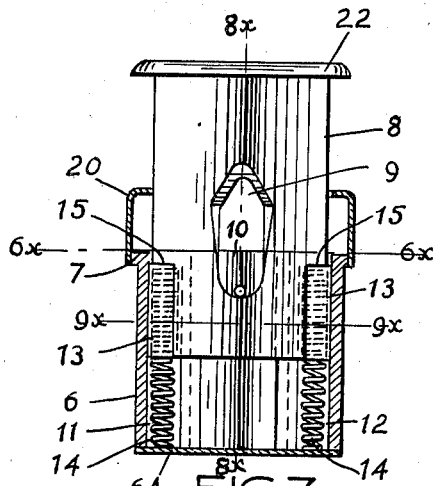
Figure 7 is a vertical sectional view of the cutting unit taken on the line $7x$—$7x$ of Figure 9.
Figure 8:
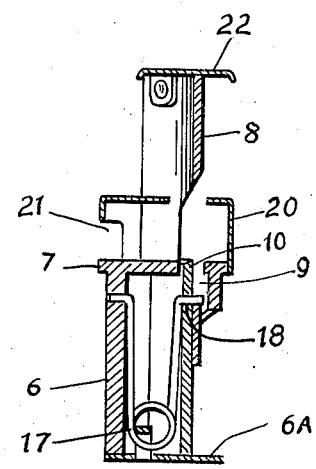
Figure 8 is a vertical sectional view of the cutting unit taken on the line $8x$—$8x$ of Figure 7.
Figure 9:
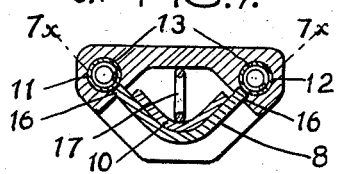
Figure 9 is a horizontal sectional view of the cutting unit taken on the line $9x$—$9x$ of Figure 7.
Figure 10:
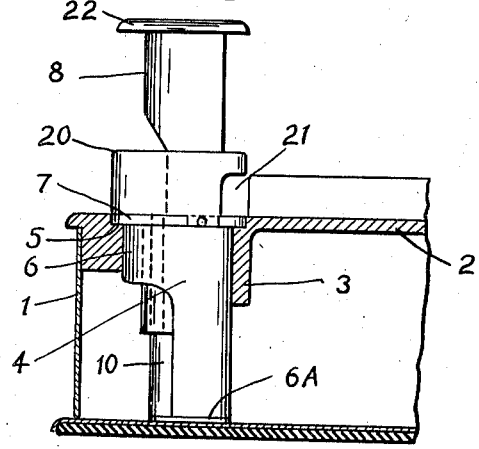
Figure 10 is a vertical sectional view thru the corner of the cutting machine taken on the line $10x$—$10x$ of Figure 1.
Figure 11:
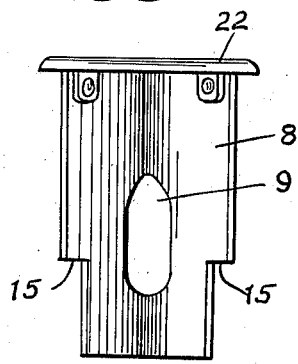
Figure 11 is a detail front elevation of the movable trimming knife.
Figure 12:
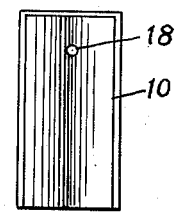
Figure 12 is a detail front elevation of the stationary cutting blade.

In the body member 6 is mounted to reciprocate the trimming or corner rounding cutter 8. The latter has augularly disposed sides with a rounded corner between the sides. The cutting edge of the cutter is provided by the substantially triangular upper portion of the opening 9 thru the rounded corner of the cutter. The edge of this inverted V shaped portion of the opening 9 is beveled as illustrated in Figures 7 and 8 so as to provide upwardly and inwardly inclined cutting edges which terminate in a rounded cutting edge at the top of the opening 9.

The body member 6 of the cutting units is provided with a pair of guide cylinders 11 and 12 which are closed at the top and open at the bottom and in each of these cylinders is mounted to slide a guide thimble 13. An expansion spring 14, which rests on the base plate 6A that closes the bottom of the guide cylinders in the body member 6, extends into each of the guide thimbles to normally and yieldingly hold these guide thimbles in their elevated position illustrated in Figure 7. The guide thimbles serve as support and guide for the movable trimming knife 8 which, for this purpose, is cut away to provide the shoulders 15, 15 thereon. Each of the guide cylinders has a slot 16 cut into the wall thereof to have the outer vertical edges of the cut away portion of the trimming cutter 8 project therethru against the wall of the guide thimbles 13 and have the shoulders 15 of the trimming cutter rest on the guide thimbles for the normal support thereof. The slots 16 are extended thru the closed top of the guide cylinders so as to allow the outer edges of the upper portion of the trimming cutter to move therethru on the downward movement of the cutter.

Cooperating with the movable trimming cutter 8 is a stationary cutter 10. The latter corresponds in cross section with the trimming cutter except that it is narrow in order to have it nest freely into the cutter 8 intermediate the guide cylinders of the latter.

A torsion spring 17 is anchored to the base plate 6A so as to hold it against the body member 6 while the free end thereof yieldingly rests against the stationary cutting blade and passes thru the hole 18 thereof and into the lower end of the opening 9 in the trimming cutter 8. The spring thus serves to yieldingly hold the stationary cutter against the movable trimming cutter and by its engagement thru the stationary cutter into the opening of the movable cutter holds the stationary cutter anchored in the body member 6 and limits the upward movement of the trimming cutter to which the guide thimbles 13 can raise the trimming cutter for the normal elevated position thereof. The stationary cutter 10 has a beveled cutting edge at the top which extends straight across the opening 9 of the trimming cutter in order to cooperate with the oppositely inclined cutting edges of the latter to produce a shearing cut beginning on both sides of the corners of any sheet member projecting thru the opening 9 in the trimming cutter.

To prevent the operator from accidentally placing a finger into the opening 9 of the trimming cutter, a guard 20 surrounds the sides and rear of the trimming cutter and projects forward with an opening 21 in the front thereof of sufficient height to permit a stack of sheets which can be efficiently cut by the trimming cutter to be inserted therethru and into the opening of the trimming cutter. A cover plate 22 is placed at the top of the trimming cutter so that the cutter may be conveniently depressed for the cutting operation either directly by the hand for trimming one or but a small number of sheets or by means of the lever 23 for trimming a stack of sheets.

The lever 23 is hinged to swing on the casing 1 by means of the link 24 in order to provide a laterally moving self adjusting connection between the lever and its point of contact with the top 22 of the trimming cutter 8. For this purpose a pressure plate 25 is mounted to rock on the under side of the lever 23 and this pressure plate carries a contact member 26 of fiber or other suitable material which can slide over the cover plate 22 without defacing the finish thereof. The pressure plate and its contact member is wider than the surface of the cover plate 22 which it contacts and a depending lug 27 at the front and a depending lug or flange 28 at the back of the pressure plate serve to automatically place the contact surface of the cover plate of the trimming cutter between the limits of the contact member 26 of the pressure plate while permitting a limited lateral movement of the contact member on the pressure plate in order to provide a substantially straight and vertical movement of the point at which pressure is applied by the lever against the trimming cutter. In this way the downward pressure is kept substantially vertical or parallel to the movement of the trimming cutter on the operation of the cutter by the lever 23. This eliminates any binding effect on the straight movement of the cutter by the angular movement of the lever. The spring 29, connected to the casing 1 with one end and to the link 24 with the other end, holds the link and with it the lever 23 in a normal position in which the lever may be swung to have the contact member of the pressure plate thereof move into and out of engagement with the contact or cover plate of the trimming cutter.

The table of the cutting machine is provided with a pair of guides 31 and 32 which are clamped to the top in line with the sides of the trimming cutter. In this way adjacent edges of the sheet stock, when moved against these guides, are lined up with the sides of the trimming cutter in which position the corner of the sheet stock projects thru the opening in the trimming cutter to have the inverted substantially V shaped cutting edge of the trimming cutter round trim the corner from opposite sides tangentially to the edges of the sheet stock. In order to prevent thin sheet stock from engaging under the guides 31 and 32 when the edges thereof are moved against them, the table is channeled at 33 and 34 in order that the base of these guides may be fastened and adjusted in these channels to have the bottom edge of the guides below and out of line with the table top.

To prevent the sheet stock placed on the table and against the guides from shifting or creeping away from the trimming cutter during the trimming operation, a friction pad 30 of soft rubber or other suitable material is embedded in the table top. The top surface of this friction pad may be flush with or be slightly above or below the surface of the table top. By exerting pressure on the sheet stock at a point over the friction pad the bottom of the sheet stock is held against the friction pad so that it cannot be displaced by the trimming cutter during the trimming operation. By holding the bottom of a stack of sheets against the friction pad the entire stack will be held against movement during the cutting action of the trimming cutter.

In trimming large sheet stock it is desirable to support a maximum area of the sheets on the table top in order to more readily line up the edges thereof with the guides and the trimming knife. For this purpose a collapsible table top section 35 is hingedly fastened to one side of the casing 1. The hinged connection is provided by substantially rectangular lugs 36 which engage into the slots 37 provided at the top of the casing 1 below the table top 2 as illustrated in Figure 3. The lugs are enlarged on the inside of the casing and thus permit them to rock in the slots 37 without being able to disengage themselves out of the slots. A pair of curved braces 38 are attached to the under side of the table top section near the outer edge thereof and these braces project thru suitable openings 39 in the side of the casing so as to slide in and out thereof when raising or lowering the table top section. To hold the table top section in an elevated position in line with the table top 2 of the casing, a lug is struck out from the side of each of the braces near their lower end to provide the shoulders 40 thereon. These shoulders are adapted to snap over the bottom edge of the openings 39 when the braces are moved out in raising the table top section and hold the braces extended from the casing to support the table top section in its elevated position. When it is desired to collapse the table top section against the side of the casing, the lower ends of the braces are raised in the openings 39 so as to disengage the shoulder 40 from the edge thereof and permit the unobstructed movement of the braces thru the openings into the casing as illustrated in dotted lines in Figure 3.

The cutting unit is mounted in the socket provided in the table top in the manner set forth in order that it may be easily and quickly removed and replaced by other units having trimming cutters with different radii or other shaped form for the cutting edge thereof. In this way one cutting machine may be provided with several interchangeable cutting units each having a different radius for its trimming cutter in order that sheet stock may be round trimmed with these different cutting units in the same machine.

To disconnect the cutting units from the operating lever it is only necessary to raise the lever to lift its contact member out of contact with the cover plate of the trimming cutter as illustrated in Figure 1. The cutting unit is then free to be lifted out of its socket for replacement by another unit. The lever with its contact member in engagement with the cover of the trimming cutter especially on the operation by the lever, holds the cutting unit in place in the socket in the table top and no other fastening means are needed to properly locate and hold it in place therein. In addition to being seated on the seat provided in the socket for its support, the cutting unit is also allowed to rest on the bottom of the casing so as to give the unit a solid non-yielding support for its operation.

I claim:

1. A cutting machine comprising a base, an aligning guide on said base, a socket in said base in a predetermined position to said guide and a cutting unit interchangeably mounted in said socket, said cutting unit comprising a body member adapted to telescopingly engage said socket, and a fixed and movable cutting blade operatively supported by said body member.

2. A cutting machine comprising a casing having a table top, an aligning guide on said table top, a socket formed in said table top in a predetermined position to said guide and extending into said casing and a cutting unit interchangeably mounted in said socket, said cutting unit comprising a body member adapted to telescopingly engage said socket, and a fixed and movable cutting blade operatively supported by said body member.

3. A cutting machine comprising a casing, a table top over said casing, a socket formed in said table top, a seat surrounding said socket in said table top, a cutting unit telescopingly mounted in said socket and a shoulder surrounding said cutting unit and adapted to be supported on said seat on the insertion thereof.

4. A cutting machine comprising a casing having a bottom, a table top at the top of said casing, a socket provided in said table top, a cutting unit telescopingly mounted in said socket and supported on the bottom of said casing, said cutting unit comprising a body member adapted to telescopingly engage said socket, and a fixed and movable cutting blade operatively supported by said body member.

5. A cutting machine comprising a casing having a bottom, a table top at the top of said casing, a socket provided in said table top, a seat surrounding said socket, a cutting unit telescopingly mounted in said socket, a shoulder surrounding said cutting unit and adapted to rest on said seat with the bottom of said cutting unit resting on the bottom of said casing.

6. A cutting machine comprising a casing, a table top for said casing, a trimming cutter movable on said table top in and out of said casing, a link mounted to swing on said casing, a lever mounted to swing on said link and a pressure plate swiveled on said lever so as to make contact with said trimming cutter and move thereon to exert pressure on said trimming cutter substantially in line with the movement of said trimming cutter on the movement of said trimming cutter by said lever.

7. A cutting machine as set forth in claim 6 including spring means for normally holding said link in a position to cause said lever to swing said pressure plate into and out of contact with said trimming cutter when swinging it toward and away from said trimming cutter.

8. In a cutting machine the combination of a body member, a pair of parallel and spaced guide cylinders in said body member, a guide thimble mounted to slide in said guide cylinders, spring means in said guide cylinders and extending into said guide thimbles for yieldingly holding said guide thimbles at one end of said guide cylinders, a trimming cutter, a shoulder provided on each side of said trimming cutter adapted to rest on top of said guide thimbles so as to yieldingly support said trimming cutter on said guide thimbles.

9. In a cutting machine the combination of a rigid body member, a pair of parallel and spaced guide cylinders in said body member, a radial slot extending from each of said guide cylinders and continued the full length of said body member, a cutting blade having its sides extending into said slots to permit a reciprocal movement therein, a shoulder on each side of said cutting blade intermediate the ends thereof, a plunger mounted to slide in each of said guide cylinders to have the shoulders in the sides of said cutting blade rest on top of said plungers and have a portion of the sides of said cutting blade below the shoulder engage the wall of said plungers to have said plungers guide said cutting blade and spring means for yieldingly supporting said plungers and holding said cutting blade in a normal elevated position.

10. In a cutting machine the combination of a supporting table, a socket extending into the top of said table, a body member telescopingly engaging into said socket, a movable cutting blade having angularly disposed sides, guide means for guiding the outer ends of said cutting blade on said body member, a stationary cutting blade having correspondingly angularly disposed sides to those of said movable cutting blade held nested against the intermediate portion of said movable cutting blade between the guided outer ends thereof.

11. In a cutting machine the combination of a supporting table, a body member removably supported by said table, vertical guides provided in said body member, a cutting blade of horizontally angular cross section having its outer edges guided by said vertical guides, a second cutting blade having a horizontally angular cross section nested against the first cutting blade intermediate the vertical guides, and a spring anchored on said body member and engaging said second spring blade to hold said second cutting blade nested against said first cutting blade and floating between said vertical guides and prevent a vertical movement of said second cutting blade on said first cutting blade.

12. In a cutting machine the combination of a table top, a cutting blade having a horizontally angular cross section with a cutting opening intermediate the sides and ends thereof movable in and out of said table top, a stationary guard spacedly surrounding said cutting blade and extending at the top in close proximity to the cutting blade above said table top with an opening in the guard below the inward extension thereof in front of the cutting opening of the cutting blade to permit the insertion of sheet stock resting on the table top into the cutting opening.

13. In a cutting machine the combination of a table top, a cutting blade having a horizontally angular cross section with a cutting opening intermediate the sides and ends thereof movable in and out of said table top, grooves in said table top extending from the sides of said cutting blade and a guide flange mounted in said grooves in line with the sides of said cutting blade with the base of said guide flanges below the surface of said table top.

14. A cutting machine comprising a casing having an open top and a closed bottom, a table top over the open top of said casing, a socket formed in said table top, a cutting unit having a body member adapted to engage into said socket to hold and removably support said cutting unit in a predetermined position in said casing, a pair of parallel guide cylinders in said body member, guide thimbles mounted to slide in said guide cylinders, a trimming knife engaging said guide thimbles for its support and guidance thereby, a spring in each of said guide cylinders to yieldingly support said guide thimbles and said trimming knife in the normal elevated position, a stationary cutting knife held yieldingly against said trimming knife and means for moving said trimming knife to provide a shearing action between it and said stationary knife.

15. A cutting machine as set forth in claim 14 in which said means for moving said trimming knife comprises a lever, a link pivotally connecting said lever to said casing, a pressure plate swiveled on the under side of said lever for engagement with said trimming knife.

THEODORE CHRISTIE.